United States Patent
Kawai et al.

(10) Patent No.: US 9,954,617 B2
(45) Date of Patent: Apr. 24, 2018

(54) STATION-SIDE APPARATUS IN OPTICAL TRANSMISSION SYSTEM, OPTICAL TRANSMISSION SYSTEM, AND OPTICAL TRANSMISSION METHOD

(71) Applicant: NIPPON TELEGRAPH AND TELEPHONE CORPORATION, Tokyo (JP)

(72) Inventors: Kenji Kawai, Tokyo (JP); Yuki Arikawa, Tokyo (JP); Tomoaki Kawamura, Tokyo (JP); Nobuyuki Tanaka, Tokyo (JP); Satoshi Shigematsu, Tokyo (JP); Naoki Miura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/505,559

(22) PCT Filed: Aug. 19, 2015

(86) PCT No.: PCT/JP2015/073195
§ 371 (c)(1),
(2) Date: Feb. 21, 2017

(87) PCT Pub. No.: WO2016/027820
PCT Pub. Date: Feb. 25, 2016

(65) Prior Publication Data
US 2017/0272167 A1    Sep. 21, 2017

(30) Foreign Application Priority Data

Aug. 22, 2014    (JP) .................................. 2014-169169

(51) Int. Cl.
H04B 10/27    (2013.01)
H04J 14/00    (2006.01)
H04B 10/40    (2013.01)

(52) U.S. Cl.
CPC ............. *H04B 10/27* (2013.01); *H04B 10/40* (2013.01)

(58) Field of Classification Search
CPC ............................... H04B 10/40; H04B 10/27
(Continued)

(56) References Cited

U.S. PATENT DOCUMENTS 6,470,032 B2 * 10/2002 Dudziak ............... H04J 3/0664
                                                              398/154
7,590,139 B2 *  9/2009 Boyd ................. H04Q 11/0067
                                                               398/71
(Continued)

FOREIGN PATENT DOCUMENTS

CN        101729944 A     9/2010
JP        2011-211262 A   10/2011
(Continued)

OTHER PUBLICATIONS

Senoo et al., Dynamic load—balancing by monitoring traffic for λ-tunable WDM/TDM-PON, IEICE Communications Express, vol. 2 No. 11, pp. 501-506, IEICE, 2003.

(Continued)

*Primary Examiner* — Ken N Vanderpuye
*Assistant Examiner* — Dibson Sanchez
(74) *Attorney, Agent, or Firm* — Womble Bond Dickinson (US) LLP

(57) ABSTRACT

An OLT (1) is formed by N optical transceivers (11), one PON control circuit (12), and one selection and distribution circuit (13). An optical transceiver selection control signal (SC) is transferred from the PON control circuit (12) to the (Continued)

selection and distribution circuit (13). The optical transceiver selection control signal (SC) indicates the timing of a discovery window, the timing of a grant, and a logical link identification number of a registered ONU assigned to the grant (a logical link identification number for a logical link with the registered ONU). The selection and distribution circuit (13) selects one optical transceiver (11-$s$ ($s$ is an integer falling within a range of 0 to N−1)) from the optical transceivers (11-0 to 11-$N_{-1}$) based on the optical transceiver selection control signal (SC) from the PON control circuit (12).

7 Claims, 14 Drawing Sheets

(58) Field of Classification Search
USPC .......................................... 398/58–64, 66–73
See application file for complete search history.

(56) References Cited

U.S. PATENT DOCUMENTS

| | | | | |
|---|---|---|---|---|
| 7,620,325 B2* | 11/2009 | Mizutani | H04L 47/10 | 398/67 |
| 7,760,734 B2* | 7/2010 | Yoon | H04J 3/1694 | 398/99 |
| 8,428,456 B2* | 4/2013 | Zheng | H04J 14/0282 | 398/2 |
| 8,548,327 B2* | 10/2013 | Hirth | H04Q 11/0067 | 398/67 |
| 2002/0021472 A1* | 2/2002 | Nakaishi | H04J 14/0282 | 398/168 |
| 2002/0109876 A1* | 8/2002 | Eijk | H04B 10/032 | 398/2 |
| 2002/0135843 A1* | 9/2002 | Gruia | H04B 10/272 | 398/167.5 |
| 2004/0208537 A1* | 10/2004 | Lee | H04J 14/0226 | 398/41 |
| 2005/0047782 A1* | 3/2005 | Davis | H04L 12/2856 | 398/58 |
| 2005/0158048 A1* | 7/2005 | Sung | H04J 3/1694 | 398/66 |
| 2005/0249500 A1* | 11/2005 | Liaw | H04Q 11/0067 | 398/70 |
| 2006/0171714 A1 | 8/2006 | Dove | | |
| 2006/0257149 A1* | 11/2006 | Hirth | H04B 10/272 | 398/72 |
| 2007/0014574 A1* | 1/2007 | Yada | H04B 10/2916 | 398/71 |
| 2007/0019957 A1* | 1/2007 | Kim | H04Q 11/0067 | 398/72 |
| 2007/0058973 A1* | 3/2007 | Tanaka | H04B 10/032 | 398/1 |
| 2007/0064719 A1* | 3/2007 | Tanaka | H04J 3/1694 | 370/437 |
| 2007/0110441 A1* | 5/2007 | Saito | H04L 41/0803 | 398/71 |
| 2007/0147835 A1* | 6/2007 | Kim | H04J 14/0226 | 398/71 |
| 2008/0025724 A1* | 1/2008 | Ozaki | H04Q 11/0067 | 398/68 |
| 2008/0037981 A1* | 2/2008 | Mukojima | H04Q 11/0067 | 398/10 |
| 2008/0304828 A1* | 12/2008 | Mizutani | H04B 1/707 | 398/78 |
| 2009/0263132 A1* | 10/2009 | Rafel | H04J 3/0682 | 398/66 |
| 2009/0297162 A1* | 12/2009 | Kai | H04J 3/1694 | 398/135 |
| 2010/0104286 A1 | 4/2010 | Okuno et al. | | |
| 2010/0254706 A1* | 10/2010 | Hirth | H04J 14/0282 | 398/48 |
| 2011/0026926 A1* | 2/2011 | Yamashita | H04J 3/1694 | 398/79 |
| 2011/0129226 A1 | 6/2011 | Vleugels et al. | | |
| 2011/0235635 A1* | 9/2011 | Yadav | H04L 12/18 | 398/58 |
| 2012/0121253 A1* | 5/2012 | Zhang | H04Q 11/0067 | 398/25 |
| 2012/0195589 A1* | 8/2012 | Nors | H04L 45/22 | 398/5 |
| 2012/0294611 A1* | 11/2012 | Adler | H04Q 11/0067 | 398/45 |
| 2013/0045005 A1 | 2/2013 | Nakura et al. | | |
| 2013/0121684 A1* | 5/2013 | Smith | H04Q 11/0067 | 398/5 |
| 2013/0259482 A1* | 10/2013 | Sarashina | H04B 10/27 | 398/67 |
| 2013/0272699 A1* | 10/2013 | Liang | H04B 10/071 | 398/45 |
| 2013/0322869 A1 | 12/2013 | Hirth et al. | | |
| 2014/0126910 A1* | 5/2014 | Luo | H04Q 11/0067 | 398/67 |
| 2014/0219654 A1* | 8/2014 | Mitsui | H04Q 11/0067 | 398/45 |
| 2016/0087748 A1* | 3/2016 | Khotimsky | H04B 10/272 | 398/67 |

FOREIGN PATENT DOCUMENTS

| | | |
|---|---|---|
| JP | 2012-019353 A | 1/2012 |
| TW | 201348686 A | 1/2013 |

OTHER PUBLICATIONS

Lecture on Basic Technologies [GE-PON Technology] Part1, "What Is PON?", NTT Technical Review, vol. 17, No. 8, pp. 71-74, 2005.

* cited by examiner

STATION-SIDE APPARATUS IN OPTICAL TRANSMISSION SYSTEM, OPTICAL TRANSMISSION SYSTEM, AND OPTICAL TRANSMISSION METHOD

TECHNICAL FIELD

The present invention relates to a station-side apparatus (OLT: Optical Line Terminal) in an optical transmission system that transfers frames between a host apparatus and a plurality of subscriber-side apparatuses (ONUs: Optical Network Units) connected via an optical transmission channel (PON: Passive Optical Network), the optical transmission system, and an optical transmission method.

BACKGROUND ART

In 2009, standardization of 10G-EPON (10 Gigabit Ethernet Passive Optical Network: "Ethernet" is a registered trademark) in IEEE802.3av was completed. The 10G-EPON features transfer 10 times faster than GE-PON (Gigabit Ethernet Passive Optical Network: see non-patent literature 1) already in widespread use.

An overview of the arrangement of a GE-PON system related to FIG. 13 will be described. In this GE-PON system, an OLT 100 transfers frames between a host apparatus (not shown) and a plurality of ONUs 3 connected via an optical splitter 2.

The OLT 100 for the GE-PON incorporates an optical transceiver 11 and a PON control circuit 12. In the OLT 100, the optical transceiver 11 performs electro-optical conversion of a downstream frame (downstream electrical signal DS) into an optical signal to be output to the ONUs 3 connected via the optical splitter 2, and photoelectric conversion of an upstream frame (optical signal) from one of the ONUs 3 into an electrical signal (upstream electrical signal US).

The IEEE standard defines that the maximum number of ONUs 3 connectable to one optical transceiver 11 in the OLT 100 is 32. Thus, if it is necessary to connect 33 or more ONUs 3 as stations accommodating the ONUs 3, in general, a plurality of optical splitters 2 are provided between the OLT 100 and the ONUs 3 and a plurality of optical transceivers 11 and a plurality of PON control circuits 12 are used, as shown in FIG. 14.

In the 10G-EPON system as well, the IEEE standard defines that the maximum number of ONUs connectable to one optical transceiver is 32. Since, however, a PON control apparatus for 10G-EPON is required to have performance (10-time data transfer rate) higher than a PON control apparatus for GE-PON, the cost of the apparatus (the purchase price of the apparatus or the like) is higher. Therefore, as a problem for adopting the 10G-EPON system, the system cost (connection cost) for one ONU needs to be made as low as possible.

As a countermeasure against the above problem, it is considered to reduce the number of optical transceivers and that of PON control circuits for one ONU by increasing the number of ONUs connectable to one optical transceiver. For example, there is proposed a technique of allowing connection of 33 or more ONUs by using an optical amplifier (see, for example, patent literature 1).

However, there is still a problem that the cost (purchase cost or the like) of the optical amplifier is higher than that of a part (LSI or the like) for an electrical circuit.

RELATED ART LITERATURE

Patent Literature

Patent Literature 1: Japanese Patent Laid-Open No. 2012-19353

Non-Patent Literature

Non-Patent Literature 1: "Lecture on Basic Technologies [GE-PON Technology] Part 1, What Is PON?", NTT Technical Review, Vol. 17, No. 8, pp. 71-74, 2005

DISCLOSURE OF INVENTION

Problem to be Solved by the Invention

The present invention has been made to solve the above-described problems, and has as its object to reduce the system cost (connection cost) for one ONU in a PON system, especially, a 10G-EPON system.

Means of Solution to the Problem

In order to achieve the above object of the present invention, there is provided a station-side apparatus in an optical transmission system, for transferring frames between a host apparatus and a plurality of subscriber-side apparatuses connected via first to Nth (N≥2) optical splitters, comprising first to Nth optical transceivers that are connected to the first to Nth optical splitters in one-to-one correspondence, and each perform electro-optical conversion of a downstream electrical signal into an optical signal to be output to the subscriber-side apparatuses and photoelectric conversion of an optical signal from one of the subscriber-side apparatuses into an upstream electrical signal, a selection and distribution circuit that selects one of the first to Nth optical transceivers and outputs an upstream electrical signal input from the selected one of the optical transceivers while distributing and outputting the downstream electrical signal to the first to Nth optical transceivers, and a control circuit that controls the plurality of subscriber-side apparatuses not to transmit upstream frames at the same time while controlling the selection and distribution circuit, the selection and distribution circuit including a selection control unit that selects one of the first to Nth optical transceivers based on a timing of a discovery window for waiting for reception of a registration request frame from an unregistered subscriber-side apparatus, a timing of a grant as a reception period of an upstream frame from a registered subscriber-side apparatus, and a logical link identification number for a logical link with the registered subscriber-side apparatus assigned to the grant, all of which are transmitted from the control circuit.

Effect of the Invention

According to the present invention, since an OLT is formed by N optical transceivers, one PON control circuit, and one selection and distribution circuit, it can accommodate N×32 ONUs, thereby reducing the system cost (connection cost) for one ONU in a PON system, especially, a 10G-EPON system.

BEST MODE FOR CARRYING OUT THE INVENTION

Embodiments of the present invention will be described below with reference to the accompanying drawings.

First Embodiment

Figure 1:
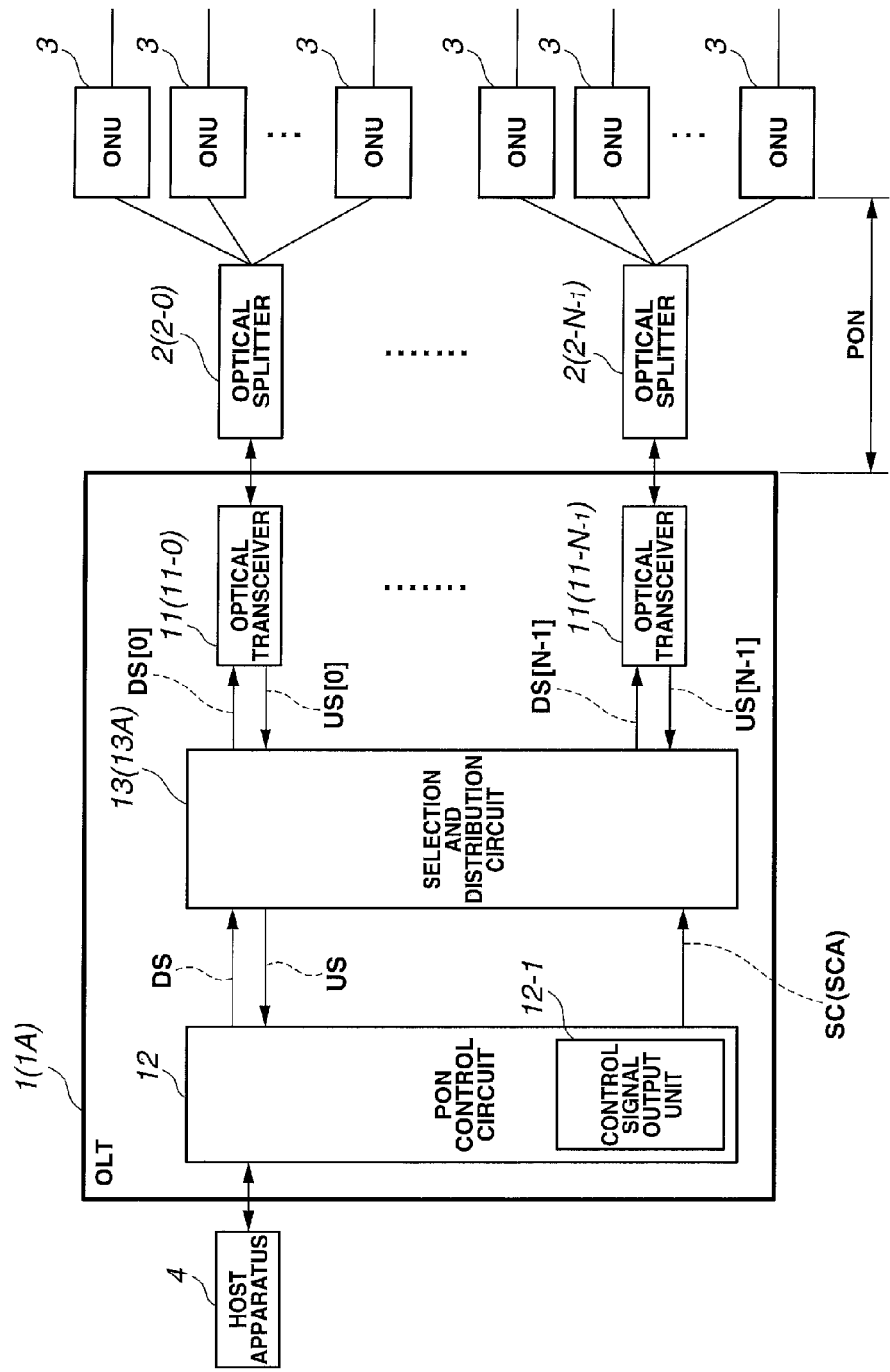
FIG. 1 is a block diagram showing an example of the arrangement of a PON system according to the first embodiment of the present invention.

FIG. 1 shows an example of the arrangement of a PON system according to the first embodiment of the present invention.

In this PON system, an OLT 1 (1A) is formed by N (N≥2: N is an integer of 2 or more) optical transceivers 11 (11-0 to 11-N$_{-1}$), one PON control circuit 12, and one selection and distribution circuit 13.

In the OLT 1A, an optical transmission channel including optical splitters 2 between the OLT 1A and ONUs 3 is set as a PON section, and up to 32 ONUs 3 are commonly connected to one optical transceiver 11 via one optical splitter 2.

That is, the optical transceivers 11-0 to 11-N$_{-1}$ are respectively connected to the optical splitters 2-0 to 2-N$_{-1}$, and up to 32 ONUs 3 are connected to each of the optical splitters 2-0 to 2-N$_{-1}$. Therefore, the OLT 1A accommodates the N×32 ONUs 3 in total. The OLT 1A transfers frames between a host apparatus 4 and the plurality of ONUs 3 connected via the optical splitters 2.

Figure 14:
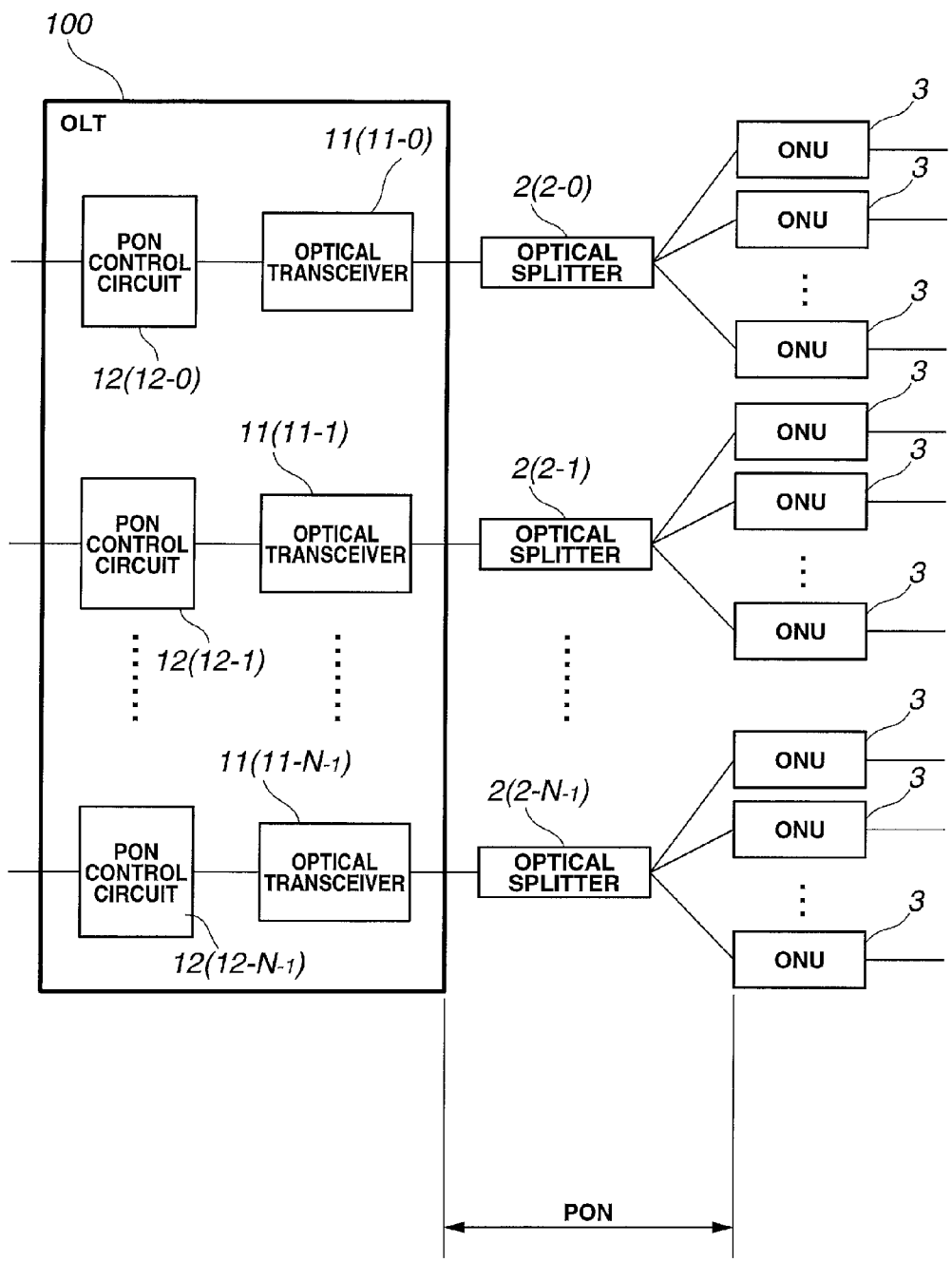
FIG. 14 is a block diagram showing another example of the arrangement of the conventional GE-PON system.

The difference in arrangement between this PON system and the conventional PON system shown in FIG. 14 is that the PON system according to this embodiment is provided with one PON control circuit 12 for one OLT 1 and provided with one selection and distribution circuit 13 between the one PON control circuit 12 and the N optical transceivers 11-0 to 11-N$_{-1}$. The PON control circuit 12 controls the plurality of ONUs 3 not to transmit upstream frames at the same time. The PON control circuit 12 includes a control signal output unit 12-1, and outputs an optical transceiver selection control signal SC from the control signal output unit 12-1 to the selection and distribution circuit 13.

The selection and distribution circuit 13 (13A) selects one optical transceiver 11-$s$ ($s$ is an integer falling within a range of 0 to N−1) from the N optical transceivers 11-0 to 11-N$_{-1}$ based on the optical transceiver selection control signal SC, and outputs, to the PON control circuit 12, an upstream electrical signal US[$s$] output from the selected optical transceiver 11-$s$ while distributing and outputting, to the N optical transceivers 11-0 to 11-N$_{-1}$, a downstream electrical signal DS from the PON control circuit 12.

Figure 2:
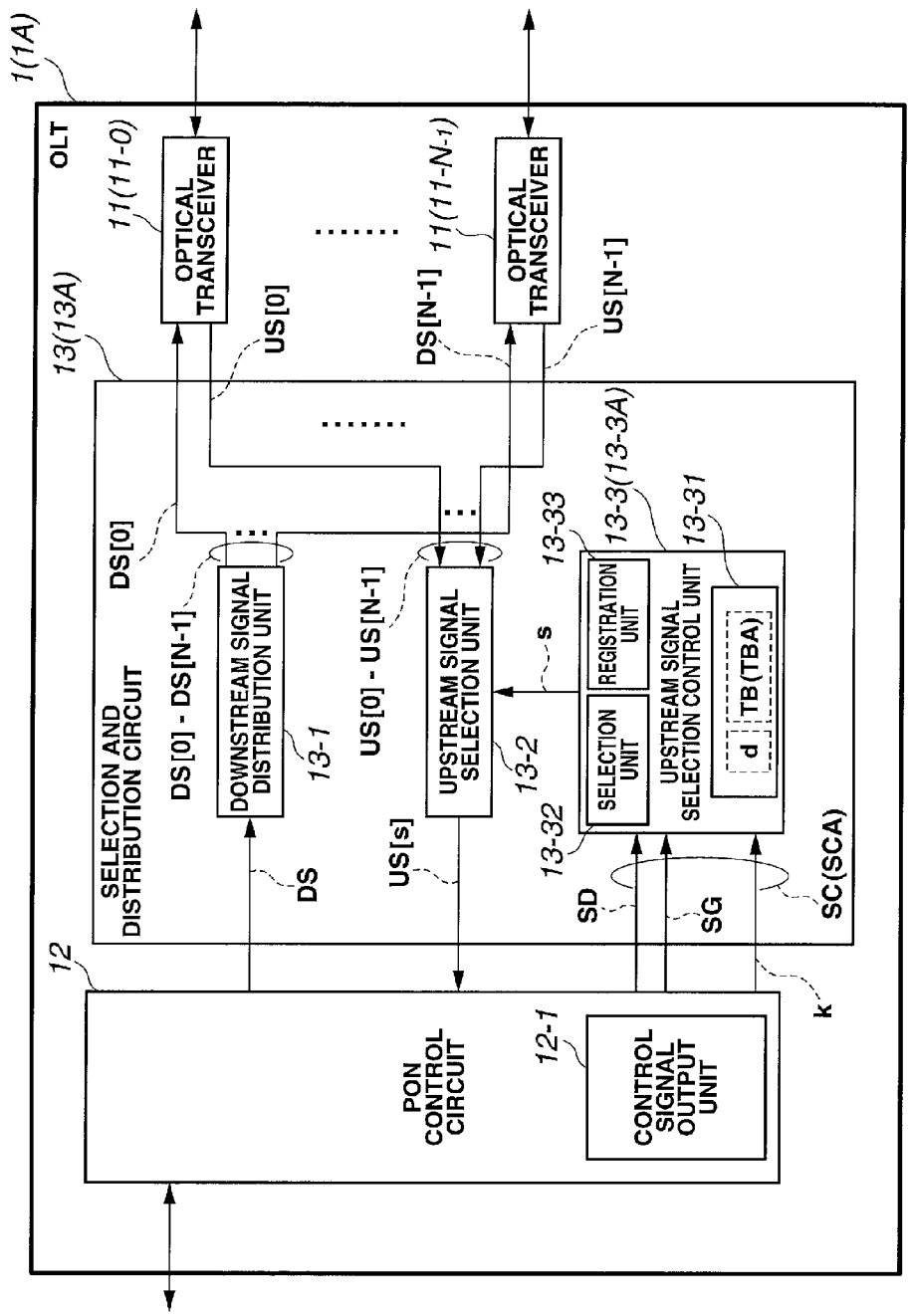
FIG. 2 is a block diagram showing an example of the arrangement of a selection and distribution circuit in an OLT according to the first embodiment.

FIG. 2 shows an example of the arrangement of the selection and distribution circuit 13 in the OLT 1A. The selection and distribution circuit 13A is formed by a downstream signal distribution unit 13-1, an upstream signal selection unit 13-2, and an upstream signal selection control unit 13-3.

The downstream signal distribution unit 13-1 generates N downstream electrical signals DS[0] to DS[N−1] by copying the downstream electrical signal DS input from the PON control circuit 12, and outputs the generated downstream electrical signals DS[0] to DS[N−1] to the optical transceivers 11-0 to 11-N$_{-1}$, respectively.

The upstream signal selection unit 13-2 selects the one optical transceiver 11-$s$ from the N optical transceivers 11-0 to 11-N$_{-1}$, and outputs, to the PON control circuit 12, the upstream electrical signal US[$s$] output from the selected optical transceiver 11-$s$.

That is, the upstream signal selection unit 13-2 receives N upstream electrical signals US[0] to US[N−1] respectively output from the N optical transceivers 11-0 to 11-N$_{-1}$, selects the one upstream electrical signal US[$s$] from the received N upstream electrical signals US[0] to US[N−1], and outputs the selected signal to the PON control circuit 12.

The upstream signal selection control unit 13-3 (13-3A) receives an optical transceiver selection control signal SC (SCA) from the PON control circuit 12, generates an optical transceiver selection signal $s$, and outputs the generated signal to the upstream signal selection unit 13-2. Note that the optical transceiver selection signal $s$ is a signal to cause the upstream signal selection unit 13-2 to select the one optical transceiver 11-$s$ from the N optical transceivers 11-0 to 11-N$_{-1}$.

The upstream signal selection control unit 13-3A receives, as the optical transceiver selection control signal SCA, a discovery window signal SD, a grant signal SG, and a new registration logical link identification number $k$ from the PON control circuit 12. The discovery window signal SD is a signal indicating the timing of a discovery window for waiting for reception of a registration request frame from an unregistered ONU 3. The grant signal SG is a signal indicating the timing of a grant as the reception period of an upstream frame from a registered ONU 3 and a logical link identification number g for a logical link with the registered ONU 3 assigned to the grant.

Note that the discovery window signal SD and the grant signal SG are used to generate the optical transceiver selection signal s. The new registration logical link identification number k is used to create an optical transceiver selection table TB (to be described later).

The upstream signal selection control unit 13-3A stores, as a discovery target optical transceiver identification number which is a variable in the upstream signal selection control unit 13-3A, an optical transceiver identification number d for specifying one optical transceiver 11-d (d is an integer falling within a range of 0 to N−1) among the N optical transceivers 11-0 to 11-N$_{-1}$. The optical transceiver identification number d is stored in a memory 13-31 in the upstream signal selection control unit 13-3A.

Furthermore, the upstream signal selection control unit 13-3A updates the value of the discovery target optical transceiver identification number d when the discovery window signal SD input from the PON control circuit 12 indicates the start of the discovery window, and generates the optical transceiver selection signal s (a signal having a value of d) for selecting, as the upstream electrical signal US[s], the upstream electrical signal US[d] output from the one optical transceiver 11-d specified by the discovery target optical transceiver identification number d during a period when the discovery window signal SD indicates the timing of the discovery window. This optical transceiver selection signal s is generated by a selection unit 13-32 in the upstream signal selection control unit 13-3A.

With the processing of the upstream signal selection control unit 13-3A, in one discovery window, the PON control circuit 12 accepts only registration request frames from the ONUs 3 connected, via the optical splitter 2-d, to the one optical transceiver 11-d selected from the N optical transceivers 11-0 to 11-N$_{-1}$. The PON control circuit 12 outputs, to the upstream signal selection control unit 13-3A, as the new registration logical link identification number k, the logical link identification number for the logical link with the registered ONU 3 by accepting the registration request frame. This allows the upstream signal selection control unit 13-3A to associate the optical transceiver identification number d and the logical link identification number k.

With this processing, it is possible to know the association between the optical transceiver and the logical link, the upstream signal selection control unit 13-3A can acquire an optical transceiver identification number e corresponding to the logical link identification number g from the logical link identification number g of the grant signal SG output from the PON control circuit 12, and select the optical transceiver 11 specified by the acquired optical transceiver identification number e.

Note that in one discovery window, only registration request frames from the ONUs 3 connected to the selected one optical transceiver are transferred to the PON control circuit 12, and registration request frames from the ONUs 3 connected to the remaining optical transceivers are discarded. However, the PON control circuit 12 can accept registration request frames from all the ONUs 3 in N discovery windows by updating, for each discovery window, the value of the discovery target optical transceiver identification number d as the variable in the upstream signal selection control unit 13-3A.

In addition, when the new registration logical link identification number k is input from the PON control circuit 12, the upstream signal selection control unit 13-3A stores, in the optical transceiver selection table TB in the memory 13-31, in association with the logical link identification number k, the optical transceiver identification number d selected by the selection and distribution circuit 13A during the period of the discovery window when the registration request frame used as a trigger to establish the logical link with the ONU 3 indicated by the logical link identification number k is received. Storage of the optical transceiver identification number d in the optical transceiver selection table TB in association with the logical link identification number k, that is, registration of the optical transceiver identification number d in association with the logical link identification number k is implemented by a registration unit 13-33 in the upstream signal selection control unit 13-3A.

During a period when the grant signal SG input from the PON control circuit 12 indicates a grant, the upstream signal selection control unit 13-3A acquires the optical transceiver identification number e stored in the optical transceiver selection table TB in association with the logical link identification number g indicated by the grant signal SG, and generates the optical transceiver selection signal s (a signal having a value of e) for selecting, as the upstream electrical signal US[s], the upstream electrical signal US[e] output from the optical transceiver 11-e specified based on the acquired optical transceiver identification number e. Generation of the optical transceiver selection signal s is also implemented by the selection unit 13-32 in the upstream signal selection control unit 13-3A.

Note that the PON control circuit 12 performs upstream band assignment (grant assignment) for all the ONUs 3 connected to the optical splitters 2-0 to 2-N$_{-1}$ so the plurality of ONUs 3 do not transmit upstream frames at the same time, that is, so that only one of the ONUs 3 transmits an upstream frame.

The PON control circuit 12 generates the grant signal SG and the discovery window signal SD so a period during which the grant signal SG indicates the grant does not overlap a period during which the discovery window signal SD indicates a discovery window on the time axis.

There are the transmission delays of the signals SG and SD from the PON control circuit 12 to the upstream signal selection control unit 13-3A, a delay until the upstream signal selection control unit 13-3A generates the optical transceiver selection signal s based on the signals SG and SD, the transmission delay of the optical transceiver selection signal s from the upstream signal selection control unit 13-3A to the upstream signal selection unit 13-2, and a delay until the upstream signal selection unit 13-2 selects the upstream electrical signal US[s] based on the optical transceiver selection signal s. Therefore, the PON control circuit 12 desirably generates, at a timing the total time of the above delays before the timing based on the upstream electrical signal US[s], the grant signal SG and the discovery window signal SD to be output to the upstream signal selection control unit 13-3A.

The PON control circuit 12 may set the grant signal SG as a signal indicating the start timing of the grant, and the discovery window signal SD as a signal indicating the start timing of the discovery window. If such signal indicating the start timing is used, the upstream signal selection control unit 13-3A operates to generate the optical transceiver selection signal s based on the grant signal SG or the discovery window signal SD upon input of the signal, and not to change the value of the generated optical transceiver selection signal s until the grant signal SG or the discovery window signal SD is subsequently input.

As a logical link identification number assigned to each logical link under linkup, a serial number assigned to each logical link under linkup by the PON control circuit 12 may be used instead of an LLID defined in the 10G-EPON standard or GE-PON standard.

The LLID is a value represented by a 15-bit length. If the number of ONUs 3 connected to each optical splitter 2 is 32 and one LLID is assigned to each ONU 3, only N×32 of the LLID values are used. Thus, if the optical transceiver selection table TB is created using the LLID as an entry number, most entries are not used, thereby wasting the memory. To the contrary, if a serial number which can be represented by a bit length shorter than that of the LLID is used as a logical link identification number, and an optical transceiver identification number is stored using the serial number as an entry number, it is possible to obtain an effect capable of reducing waste of the memory, and implement the optical transceiver selection table TBA by a small-scale memory.

Figure 3:
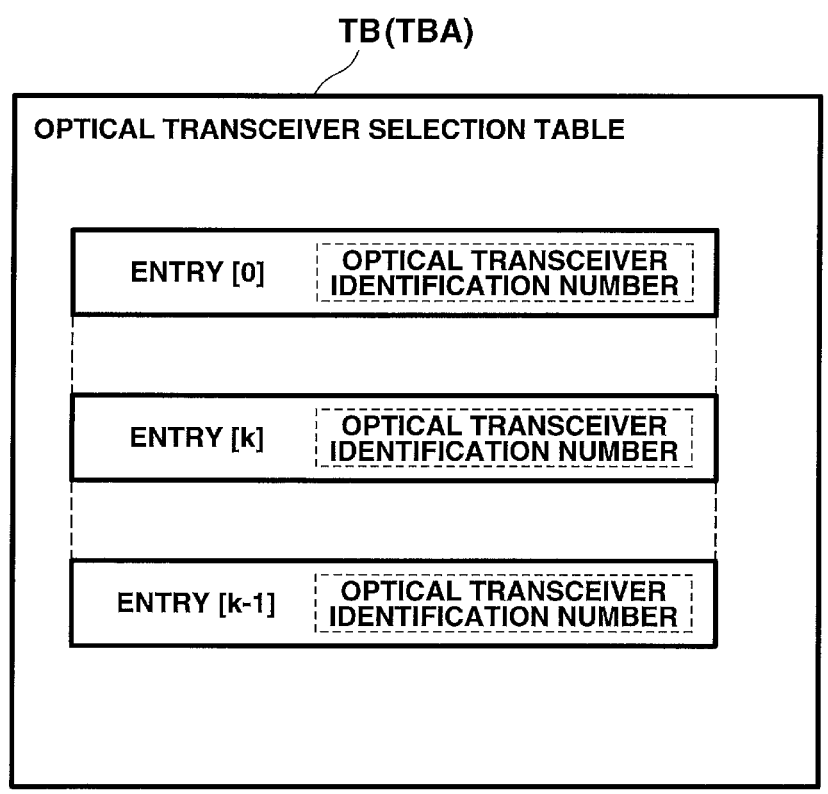
FIG. 3 is a view showing the structure of an optical transceiver selection table used in the selection and distribution circuit in the OLT according to the first embodiment.

FIG. 3 shows the structure of the optical transceiver selection table TB (TBA) in the upstream signal selection control unit 13-3A. In this optical transceiver selection table TBA, a logical link identification number is used as an entry number. The value of an optical transceiver identification number stored in association with the logical identification number is stored in an entry whose entry number is equal to the logical link identification number. For example, an optical transceiver identification number associated with a logical link identification number of 0 is stored in an entry [0], an optical transceiver identification number associated with a logical link identification number of k is stored in an entry [k], and an optical transceiver identification number associated with a logical link identification number of K−1 is stored in an entry [K−1]. Note that K in this case represents the table size (maximum entry count) of the optical transceiver selection table TBA.

The upstream signal selection control unit 13-3A acquires an optical transceiver identification number e from the entry in the optical transceiver selection table TBA, whose entry number is equal to the logical link identification number g indicated by the grant signal SG input from the PON control circuit 12, specifies the optical transceiver 11-e based on the acquired optical transceiver identification number e, and generates the optical transceiver selection signal s for selecting, as the upstream electrical signal US[s], the upstream electrical signal US[e] output from the specified optical transceiver 11-e.

If the discovery window signal SD is input from the PON control circuit 12, the upstream signal selection control unit 13-3A updates the value of the discovery target optical transceiver identification number d, and generates the optical transceiver selection signal s for selecting, as the upstream electrical signal US[s], the upstream electrical signal US[d] output from the one optical transceiver 11-d specified by the updated discovery target optical transceiver identification number d.

A procedure in which the upstream signal selection control unit 13-3A generates the optical transceiver selection signal s will be described with reference to FIG. 4.

Figure 4:
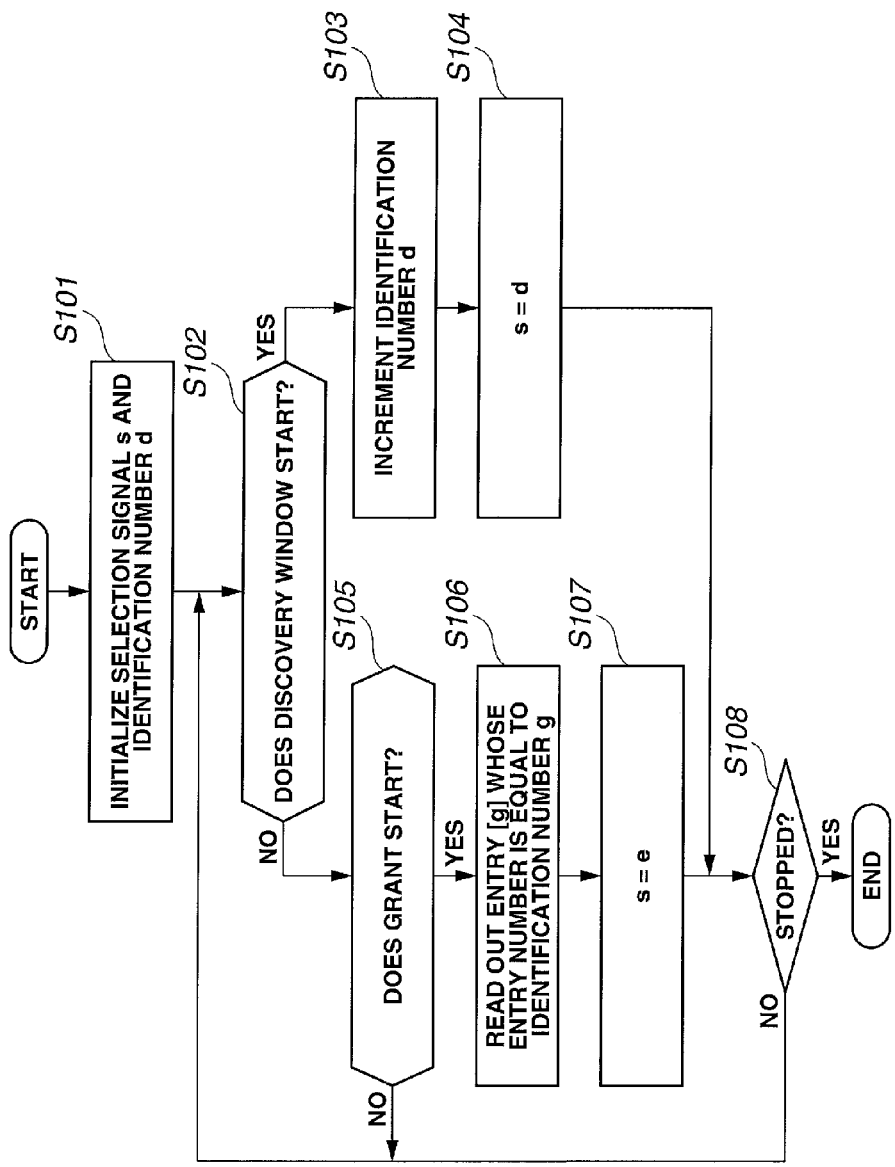
FIG. 4 is a flowchart illustrating a procedure in which the upstream signal selection control unit of the selection and distribution circuit in the OLT generates an optical transceiver selection signal according to the first embodiment.

The upstream signal selection control unit 13-3A starts the processing shown in the flowchart of FIG. 4 when the operation of the upstream signal selection control unit 13-3A becomes possible, for example, immediately after power supply to the OLT 1A or initialization of the OLT 1A thereafter, and repeats the processing until the operation of the upstream signal selection control unit 13-3A is stopped, for example, until reinitialization of the selection and distribution circuit 13A including the upstream signal selection control unit 13-3A is instructed or power supply to the OLT 1A is stopped.

[Step S101]
Immediately after the start of this procedure, the value of the optical transceiver selection signal s to be output to the upstream signal selection unit 13-2 is initialized. In this example, the initialized value is given by s=0. In addition, the value of the discovery target optical transceiver identification number d as the variable in the upstream signal selection control unit 13-3A is initialized. In this example, the initialized value is given by d=0. Next, the process advances to step S102.

[Step S102]
It is determined whether the discovery window signal SD input to the upstream signal selection control unit 13-3A indicates the start timing of a discovery window. If YES is determined, the process advances to step S103; otherwise, the process advances to step S105.

[Step S103]
The value of the discovery target optical transceiver identification number d as the variable in the upstream signal selection control unit 13-3A is incremented. If, however, the value of the discovery target optical transceiver identification number d before the increment is N−1, it is updated to 0. In this example, assume that d=(d+1) % N (d on the left-hand side represents the value after the update, d on the right-hand side represents the value before the update, and an operator "%" represents a remainder operation). Next, the process advances to step S104.

[Step S104]
The value of the optical transceiver selection signal s to be output to the upstream signal selection unit 13-2 is changed to the value of the discovery target optical transceiver identification number d updated in step S103. In this example, assume that s=d. As a result, the optical transceiver selection signal s having d as its value is generated. After that, the process returns to step S102 through step S108. If it is confirmed in step S108 that the operation has been stopped, the processing of this procedure ends.

[Step S105]
It is determined whether the grant signal SG input to the upstream signal selection control unit 13-3A indicates the start timing of a grant. If YES is determined, the process advances to step S106; otherwise, the process returns to step S102.

[Step S106]
The value e of the entry [g] whose entry number is equal to the logical link identification number g indicated by the grant signal SG input in step S105 is read out from the optical transceiver selection table TBA managed by the upstream signal selection control unit 13-3A. Next, the process advances to step S107.

[Step S107]
The value of the optical transceiver selection signal s to be output to the upstream signal selection unit 13-2 is changed to the value e of the entry [g] read out in step S106. In this example, assume that s=e. As a result, the optical transceiver selection signal s having e as its value is generated. After that, the process returns to step S102 through step S108. If it is confirmed in step S108 that the operation has been stopped, the processing of this procedure ends.

In the above procedure, the value of the discovery target optical transceiver identification number d is incremented and updated. If, however, for each optical transceiver, the presence/absence of an unregistered ONU connected to the optical transceiver is known in advance, the discovery target optical transceiver identification number d can be updated to exclude, from selection targets, the optical transceiver to which no unregistered ONU is connected. This operation can shorten the average time until unregistered ONUs are registered.

Upon input of the new registration logical link identification number k from the PON control circuit 12, the upstream signal selection control unit 13-3A stores (registers) the discovery target optical transceiver identification number d as the variable in the upstream signal selection control unit 13-3A at this time in the entry in the optical transceiver selection table TBA, whose entry number is equal to the input logical link identification number k.

A procedure in which the upstream signal selection control unit 13-3A registers the optical transceiver identification number in an entry (an entry whose entry number is equal to the logical link identification number k when the new registration logical link identification number k is input from the PON control circuit 12) in the optical transceiver selection table TBA will be described with reference to FIG. 5.

Figure 5:
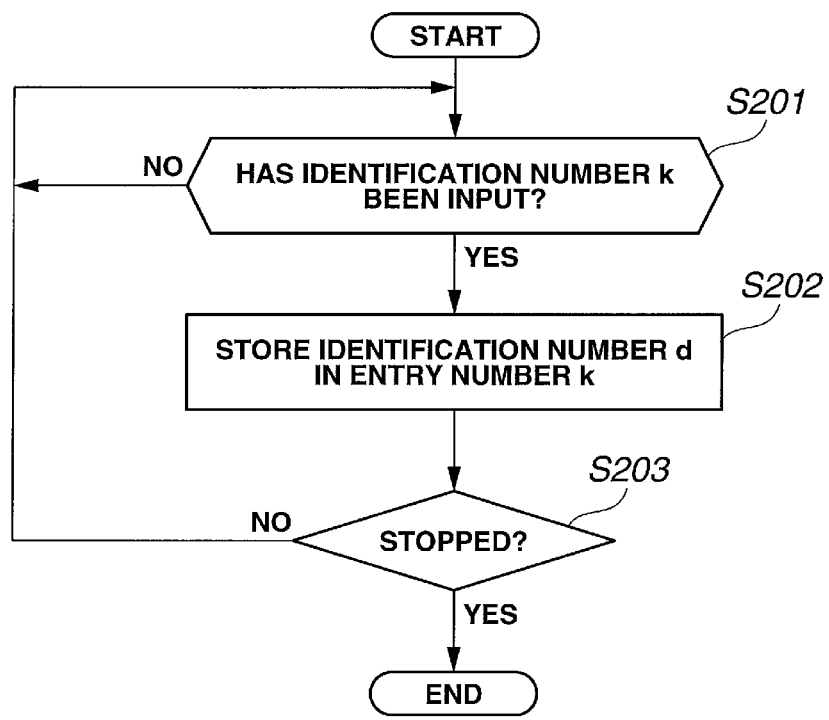
FIG. 5 is a flowchart illustrating a procedure in which the upstream signal selection control unit of the selection and distribution circuit in the OLT registers an optical transceiver identification number in an entry in the optical transceiver selection table according to the first embodiment.

The upstream signal selection control unit 13-3A starts the processing shown in the flowchart of FIG. 5 when the operation of the upstream signal selection control unit 13-3A becomes possible, for example, immediately after power supply to the OLT 1A or initialization of the OLT 1A thereafter, and repeats the processing until the operation of the upstream signal selection control unit 13-3A is stopped, for example, until reinitialization of the selection and distribution circuit 13A including the upstream signal selection control unit 13-3A is instructed or power supply to the OLT 1A is stopped. The upstream signal selection control unit 13-3A repeats the processing shown in FIG. 5 as an interrupt operation during execution of the processing shown in FIG. 4 every time the new registration logical link identification number k is input.

[Step S201]

It is determined whether the new registration logical link identification number k has been input to the upstream signal selection control unit 13-3A. If YES is determined, the process advances to step S202; otherwise, the determination processing in step S201 is repeated (the process remains in step S201 until the new registration logical link identification number k is input).

[Step S202]

The discovery target optical transceiver identification number d as the variable in the upstream signal selection control unit 13-3A is stored in the entry number k in the optical transceiver selection table TBA managed by the upstream signal selection control unit 13-3A. In this way, the optical transceiver identification number d is registered. In this example, entry [k]=d is set. After that, the process returns to step S201 through step S203. If it is confirmed in step S203 that the operation has been stopped, the processing of this procedure ends.

Note that it is necessary to complete the above procedure during a period from when the logical link between the unregistered ONU 3 and the OLT 1A is established until the OLT 1A gives a grant for this logical link.

Instead of registering the optical transceiver identification number d in the entry in the optical transceiver selection table TBA, whose entry number is equal to the new registration logical link identification number k input from the PON control circuit 12, it is possible to monitor the downstream electrical signal DS from the PON control circuit 12 in the downstream signal distribution unit 13-1, transmit, upon detecting a registration frame to be transmitted to the ONU 3 newly registered by the PON control circuit 12 in the downstream signal distribution unit 13-1, the new registration logical link identification number k included in the detected registration frame to the upstream signal selection control unit 13-3A, and register the optical transceiver identification number d in the entry in the optical transceiver selection table TBA, whose entry number is equal to the new registration logical link identification number k.

Alternatively, instead of registering the optical transceiver identification number d in the entry in the optical transceiver selection table TBA, whose entry number is equal to the new registration logical link identification number k input from the PON control circuit 12, it is possible to store both the new registration logical link identification number k and the optical transceiver identification number d in a new entry in the optical transceiver selection table TB.

Assume that the optical transceiver selection table TB storing, in a new entry, both the new registration logical link identification number k and the optical transceiver identification number d is represented by TBA'. In this case, the upstream signal selection control unit 13-3A compares the value of a logical link identification number stored in each entry in the optical transceiver selection table TBA' with the value of the logical link identification number g indicated by the grant signal SG, and acquires the optical transceiver identification number e stored in the entry which has the value of the logical link identification number equal to the value of the logical link identification number g.

Figure 6:
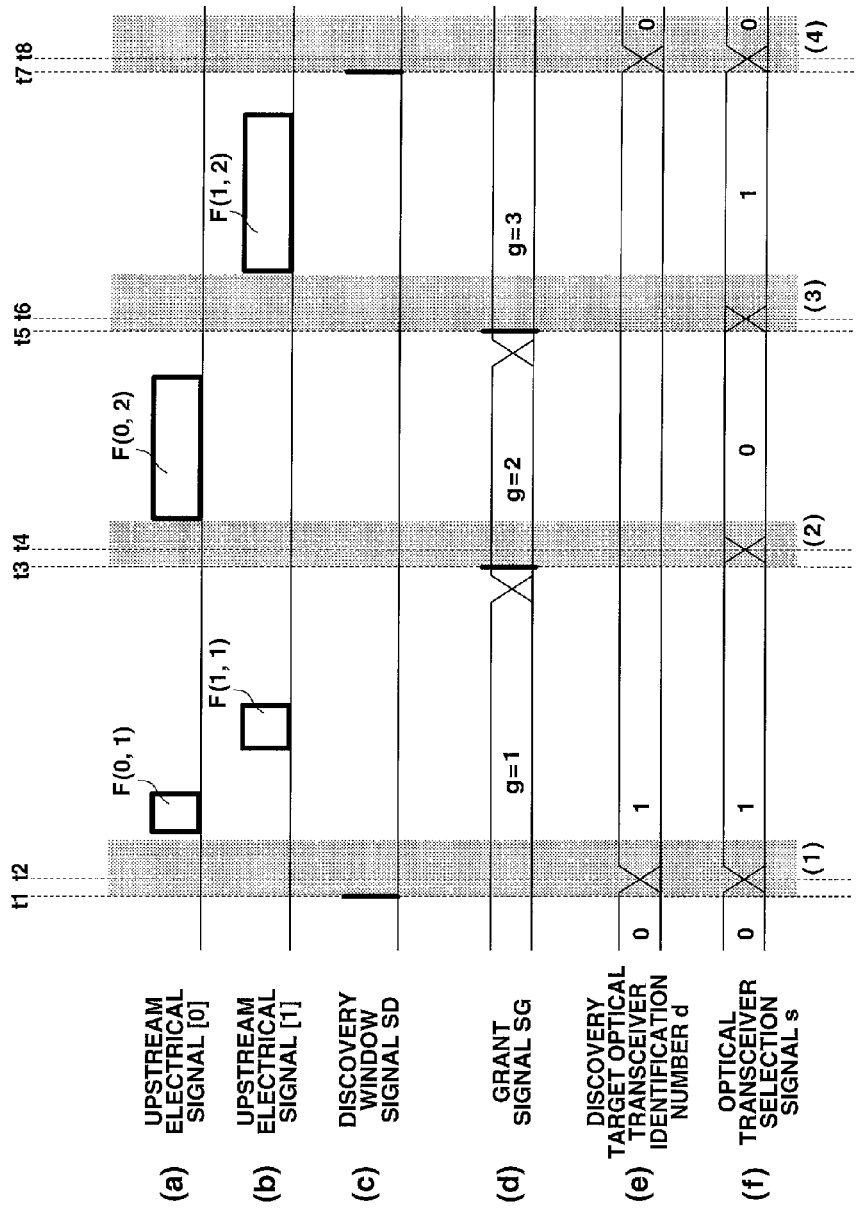
FIG. 6 is a timing chart showing an example of the operation of the upstream signal selection control unit of the selection and distribution circuit in the OLT according to the first embodiment.
Figure 7:
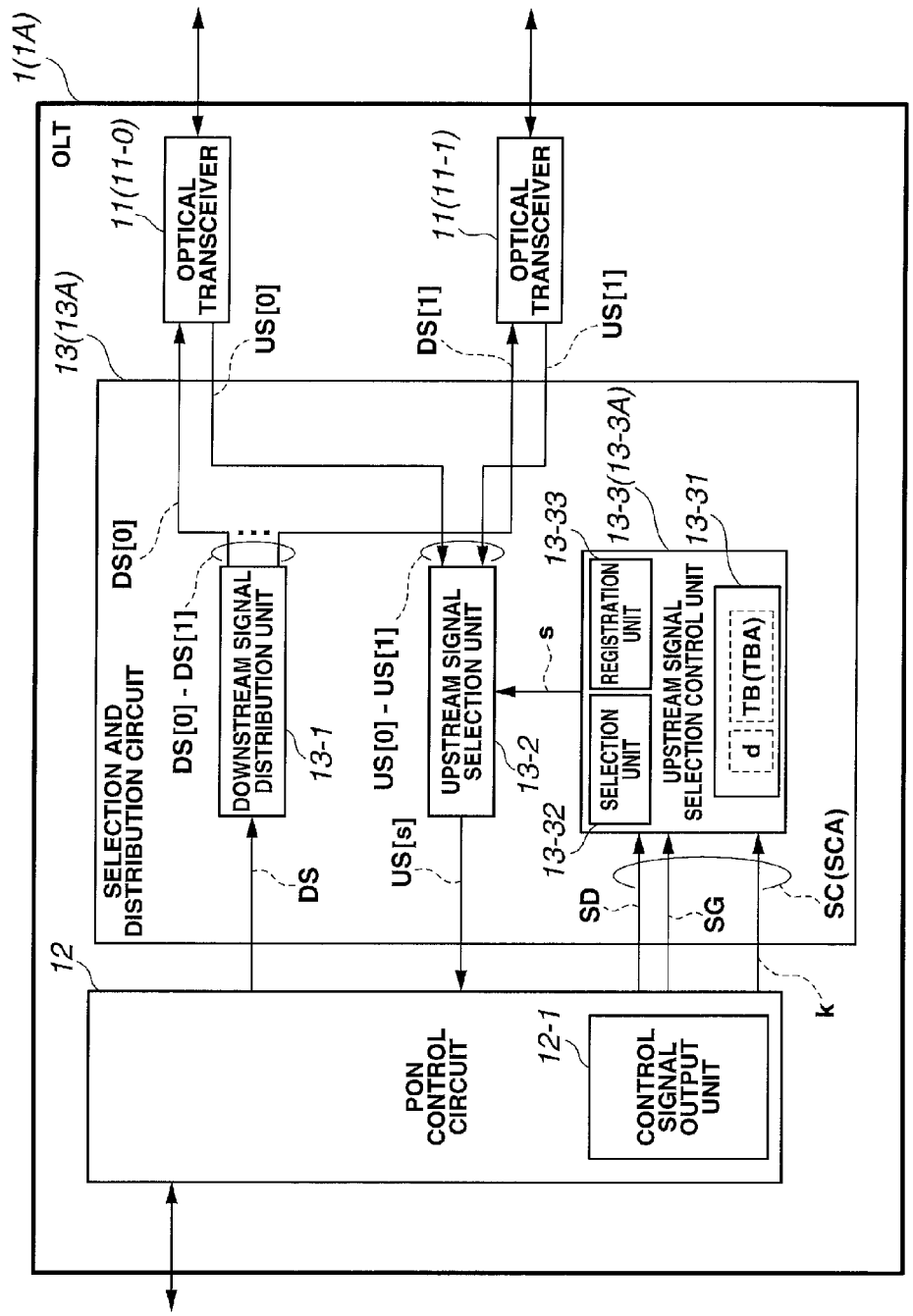
FIG. 7 is a block diagram showing the arrangement of the selection and distribution circuit in the OLT according to the first embodiment when the number N of optical transceivers is given by N=2.
Figure 8:
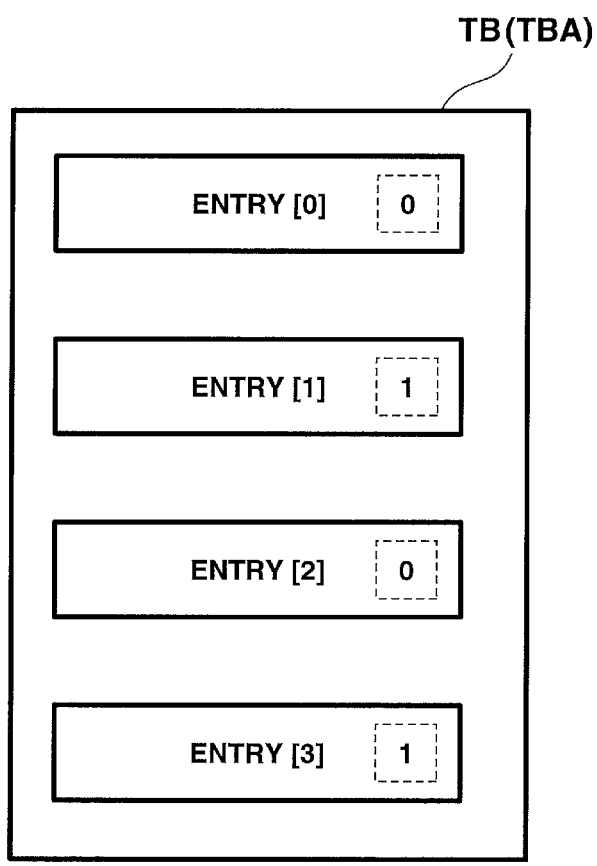
FIG. 8 is a view exemplifying optical transceiver identification numbers stored by setting, as entry numbers, logical link identification numbers in the optical transceiver selection table.

An example of the operation of the upstream signal selection control unit 13-3A will be described with reference to a timing chart shown in FIG. 6. Note that in this example, the number N of optical transceivers 11 is given by N=2, as shown in FIG. 7, the optical transceiver identification numbers stored in the optical transceiver selection table TBA are 0, 1, 0, and 1 in the order of entry numbers 0, 1, 2, and 3, as shown in FIG. 8, and the optical transceiver selection table TBA is not updated during a period indicated by the timing chart.

(1) Using, as a trigger, an indication of the start of the discovery window by the discovery window signal SD at time t1, the value of the discovery target optical transceiver identification number d as the variable in the upstream signal selection control unit 13-3A is updated at time t2. In this update processing, the value is incremented, and the discovery target optical transceiver identification number d changes from 0 to 1. Furthermore, the value of the optical transceiver selection signal s is changed to 1 as the updated value of the discovery target optical transceiver identification number d. This selects the upstream electrical signal US[1] during the period of the immediately succeeding discovery window, and inputs, to the PON control circuit 12, a registration request frame included in the upstream electrical signal US[1] among frames arriving during the period, that is, a registration request frame from the new ONU 3 connected to the optical transceiver 11-1 via the optical splitter 2-1. Note that in FIG. 6, F(0, 1) and F(1, 1) represent signals each including the registration request frame.

(2) Using, as a trigger, an indication of the start of the grant by the grant signal SG at time t3, the optical transceiver identification number e corresponding to the value "2" of the logical link identification number g of the grant signal SG is acquired from the optical transceiver selection table TBA, and the value of the optical transceiver selection signal s is changed to 0 as the acquired value of the optical transceiver identification number e at time t4. This selects the upstream electrical signal US[0] during the immediately succeeding grant period. Therefore, with respect to a logical link with the ONU 3 connected to the optical transceiver 11-0 via the optical splitter 2-0, which is indicated by the logical link identification number "2", an upstream frame from the linked ONU 3 is input to the PON control circuit 12. Note that in FIG. 6, F(0, 2) represents the grant of the logical link identification number=2.

(3) Using, as a trigger, an indication of the start of the grant by the grant signal SG at time t5, the optical transceiver identification number e corresponding to the value "3" of the logical link identification number g of the grant signal SG is acquired from the optical transceiver selection table TBA, and the value of the optical transceiver selection signal s is changed to 1 as the acquired value of the optical transceiver identification number e at time t6. This selects the upstream electrical signal US[1] during the immediately succeeding grant period. Therefore, with respect to a logical link with the ONU 3 connected to the optical transceiver 11-1 via the optical splitter 2-1, which is indicated by the logical link identification number "3", an upstream frame from the linked ONU 3 is input to the PON control circuit 12. Note that in FIG. 6, F(1, 2) represents the grant of the logical link identification number=3.

(4) Using, as a trigger, an indication of the start of the discovery window by the discovery window signal SD at time t7, the value of the discovery target optical transceiver identification number d as the variable in the upstream signal selection control unit 13-3A is updated. In this update processing, processing of returning the value to 0 is performed, and the discovery target optical transceiver identification number d changes from 1 to 0. Furthermore, the value of the optical transceiver selection signal s is changed to 0 as the updated value of the discovery target optical transceiver identification number d. This selects the upstream electrical signal US[0] during the immediately succeeding discovery window, and inputs, to the PON control circuit 12, a registration request frame included in the upstream electrical signal US[1] among frames arriving during this period, that is, a registration request frame from the new ONU 3 connected to the optical transceiver 11-0 via the optical splitter 2-0.

As indicated by the above timing chart, the OLT 1A to which the present invention is applied transfers, to the upstream signal selection control unit 13-3A, the discovery window signal SD or the grant signal SG generated in the PON control circuit 12 in order for the PON control circuit 12 to control the start timing of the discovery window or grant and its duration. This allows the upstream signal selection control unit 13-3A to select the optical transceiver 11 to receive the discovery window or grant before receiving the registration request frame or the upstream electrical signal US from the ONU 3.

In the procedure of selecting the optical transceiver 11 and transferring the reception signal to the PON control circuit 12 after detecting reception or release of reception disconnection, a signal input within the time from when a signal is input to the optical transceiver 11 until selection is completed is not input to the PON control circuit 12. It is, thus, necessary to extend a synchronization pattern positioned at the beginning of a burst without any significant signal among upstream signals transmitted by the ONU 3. However, since all signals can be input to the PON control circuit 12 by applying the present invention, it is not necessary to extend the synchronization pattern positioned at the beginning of the burst, thereby obtaining the effect of improving the upstream throughput.

As a method of selecting an upstream electrical signal, for example, there is provided a method in which a specific optical transceiver whose upstream electrical signal is selected is decided using the LOS signals of the optical transceivers. In the method using the LOS signals, however, since selection is switched after an upstream electrical signal arrives, part of a synchronization pattern at the beginning of the upstream electrical signal is not input to a circuit of the succeeding stage, and it is necessary to extend the synchronization pattern to complement it. To the contrary, in the method according to this embodiment, since switching is performed in synchronism with the arriving time of an upstream electrical signal predicted by the OLT, the problem that part of a synchronization pattern is not input to a circuit of the succeeding stage does not arise, and it is unnecessary to extend the synchronization pattern. This prevents the upstream throughput from lowering due to extension of the synchronization pattern, thereby making it possible to improve the upstream throughput.

Second Embodiment

Figure 9:
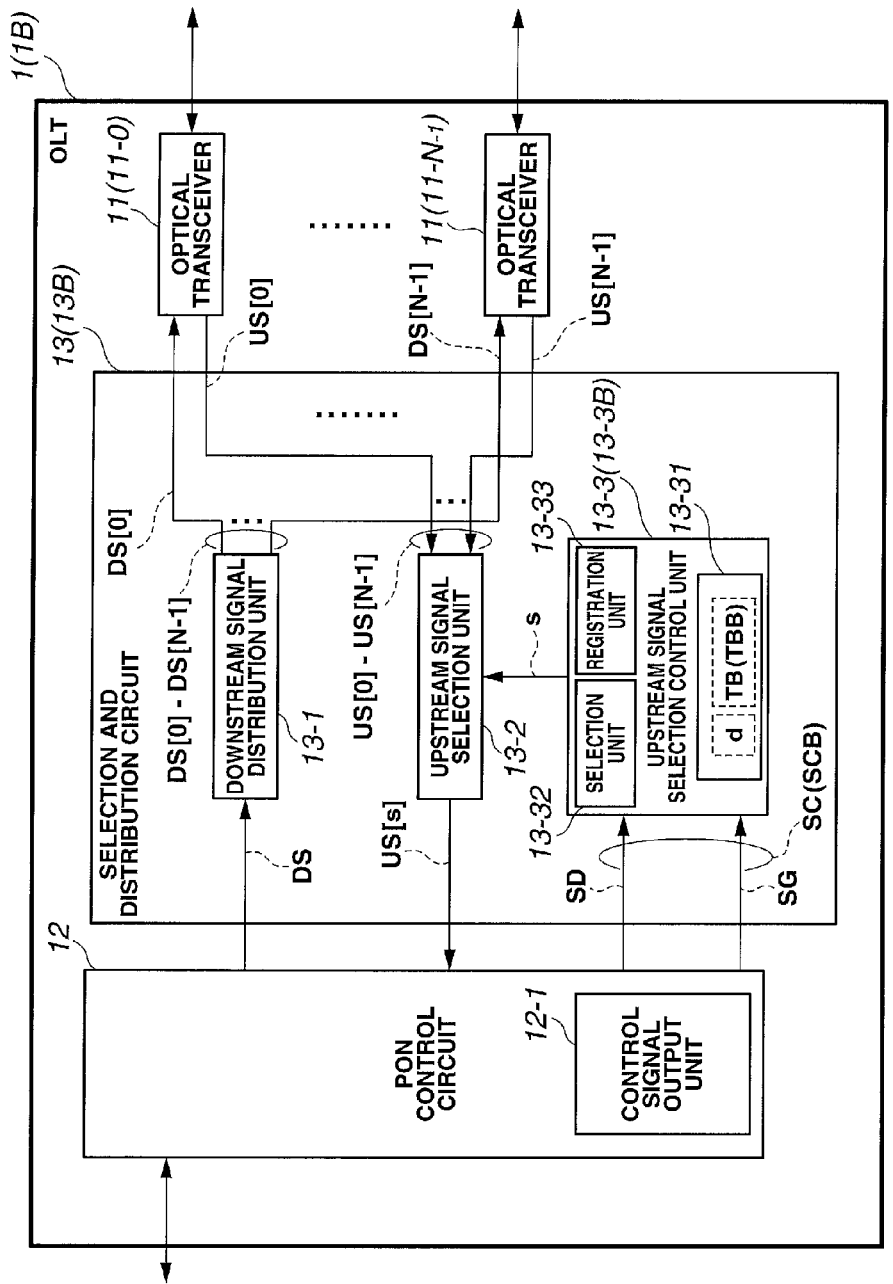
FIG. 9 is a block diagram showing an example of the arrangement of a selection and distribution circuit in an OLT according to the second embodiment.

An OLT according to the second embodiment will be described next with reference to FIG. 9. FIG. 9 is a block diagram showing an example of the arrangement of a selection and distribution circuit 13 (13B) in an OLT 1 (1B) according to the second embodiment. The difference from the arrangement of the selection and distribution circuit 13A according to the first embodiment is an optical transceiver selection control signal SC received by an upstream signal selection control unit 13-3 (13-3B) from a PON control circuit 12.

That is, the optical transceiver selection control signal SC (SCA) according to the first embodiment includes the new registration logical link identification number k to know the logical link identification number for the logical link with the registered ONU 3. The optical transceiver selection control signal SC (SCB) according to the second embodiment includes no new registration logical link identification number k.

In the first embodiment, when the new registration logical link identification number k is input from the PON control circuit 12, the upstream signal selection control unit 13-3A stores, in the optical transceiver selection table TB (TBA), in association with the logical link identification number k, the optical transceiver identification number d selected by the selection and distribution circuit 13A during the period of the discovery window when the registration request frame used as a trigger to establish the logical link with the ONU 3 indicated by the logical link identification number k is received. That is, in the first embodiment, the upstream signal selection control unit 13-3A associates the logical link identification number and the optical transceiver identification number using the new registration logical link identification number k input from the PON control circuit 12.

To the contrary, in the second embodiment, instead of inputting the new registration logical link identification number k from the PON control circuit 12, the upstream signal selection control unit 13-3B determines whether a logical link identification number g included in a grant signal SG has already been registered in an optical transceiver selection table TB, and associates, if it is determined that the logical link identification number g has not been registered, the logical link identification number and the optical transceiver identification number using the logical link identification number g included in the grant signal SG.

Figure 10:
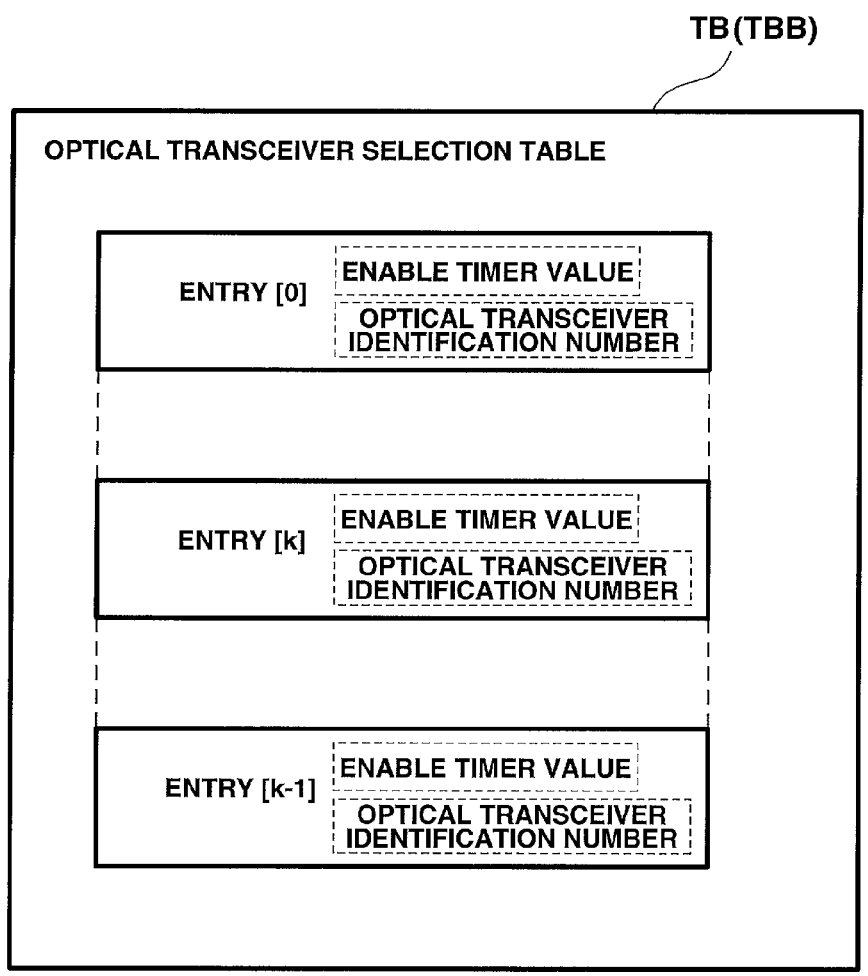
FIG. 10 is a view showing the structure of an optical transceiver selection table used in the selection and distribution circuit in the OLT according to the second embodiment.

FIG. 10 shows the structure of the optical transceiver selection table TB (TBB) used in the second embodiment. Similarly to the optical transceiver selection table TBA used in the first embodiment, in the optical transceiver selection table TBB as well, a logical link identification number is used as an entry number, and the value of an optical transceiver identification number stored in association with the logical link identification number is stored in an entry whose entry number is the logical link identification number.

Note that in the optical transceiver selection table TBB, each entry stores the value of an enable timer for managing the enable time of the entry in addition to the value of the optical transceiver identification number. The value of the enable timer decreases with time. When the value of the enable timer becomes 0, the entry is determined to be in a disable state. When determining whether the logical link identification number has already been registered in the optical transceiver selection table TBB, the value of the enable timer of the entry having the logical identification number as its entry number is read out. If the value of the enable timer is larger than 0, it is determined that the logical link identification number has already been registered in the optical transceiver selection table TBB. Alternatively, if the value of the enable timer is 0, it is determined that the logical link identification number has not been registered in the optical transceiver selection table TBB, that is, the logical link identification number is unregistered.

A procedure in which the upstream signal selection control unit 13-3B registers an optical transceiver identification number in the optical transceiver selection table TBB in association with a logical link identification number will be described with reference to FIG. 11.

Figure 11:
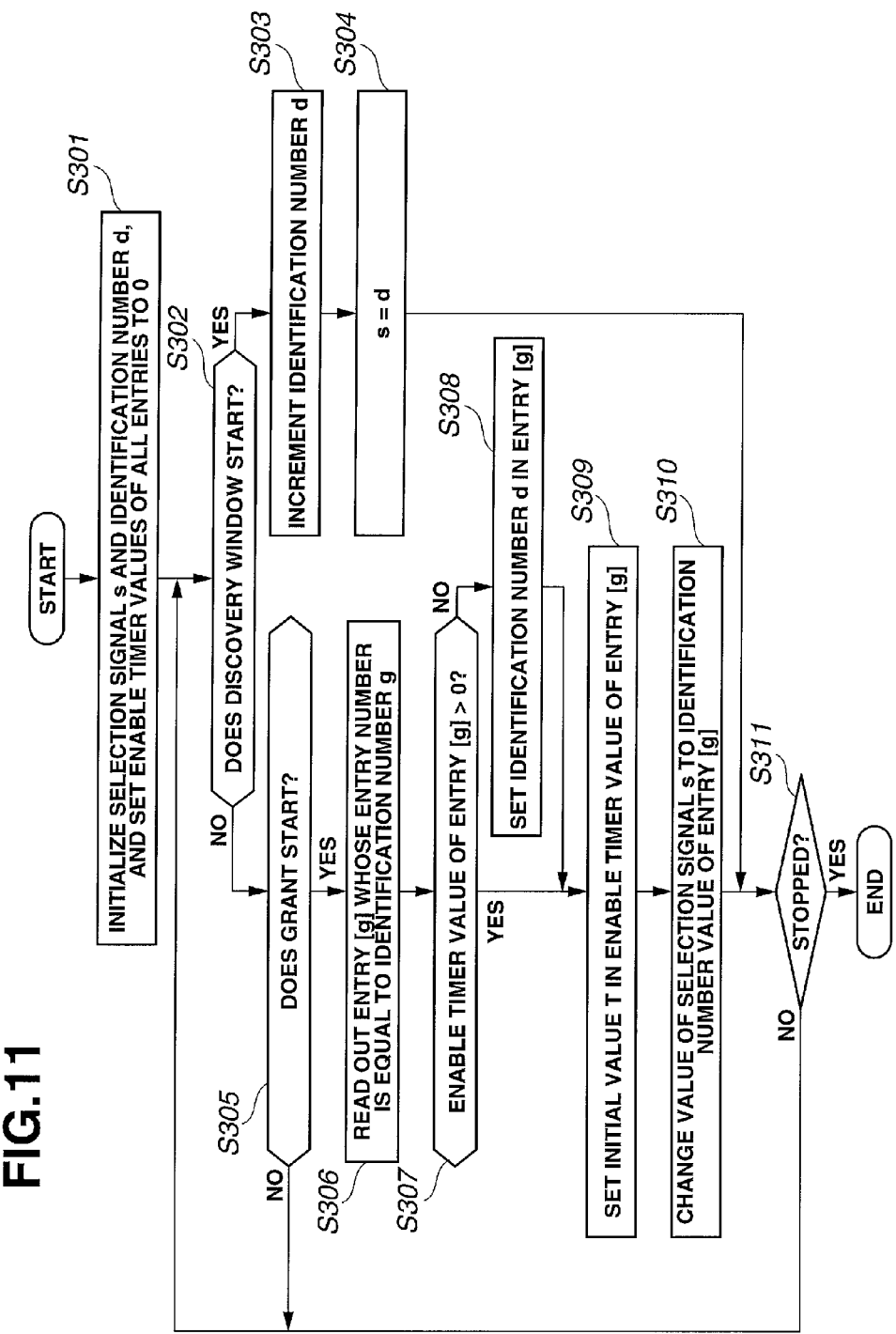
FIG. 11 is a flowchart illustrating a procedure in which an upstream signal selection control unit in the OLT registers an optical transceiver identification number in the optical transceiver selection table in association with a logical link identification number according to the second embodiment.

The upstream signal selection control unit 13-3B starts the processing of the procedure shown in the flowchart of FIG. 11 when the operation of the upstream signal selection control unit 13-3B becomes possible, for example, immediately after power supply to an OLT 1B or initialization of the OLT 1B thereafter, and repeats the processing until the operation of the upstream signal selection control unit 13-3B is stopped, for example, until reinitialization of the selection and distribution circuit 13B including the upstream signal selection control unit 13-3B is instructed or power supply to the OLT 1B is stopped.

[Step S301]
Immediately after the start of this procedure, the value of an optical transceiver selection signal s to be output to an upstream signal selection unit 13-2 is initialized. In this example, the initialized value is given by s=0. In addition, the value of a discovery target optical transceiver identification number d as a variable in the upstream signal selection control unit 13-3B is initialized. In this example, the initialized value is given by d=0. Furthermore, for all the entries in the optical transceiver selection table TBB, initialization is performed so that the logical links are unregistered. In this example, the initialized enable timer values of all the entries are set to 0. Next, the process advances to step S302.

[Step S302]
It is determined whether a discovery window signal SD input to the upstream signal selection control unit 13-3B indicates the start timing of a discovery window. If YES is determined, the process advances to step S303; otherwise, the process advances to step S305.

[Step S303]
The value of the discovery target optical transceiver identification number d as the variable in the upstream signal selection control unit 13-3B is incremented. If, however, the value of the discovery target optical transceiver identification number d before the increment is N−1, it is updated to 0. In this example, assume that d=(d+1) % N (d on the left-hand side represents the value after the update, d on the right-hand side represents the value before the update, and an operator "%" represents a remainder operation). Next, the process advances to step S304.

[Step S304]
The value of the optical transceiver selection signal s to be output to the upstream signal selection unit 13-2 is changed to the value of the discovery target optical transceiver identification number d updated in step S303. In this example, assume that s=d. After that, the process returns to step S302 through step S311. If it is confirmed in step S311 that the operation has been stopped, the processing of this procedure ends.

[Step S305]
It is determined whether the grant signal SG input to the upstream signal selection control unit 13-3B indicates the start timing of a grant. If YES is determined, the process advances to step S306; otherwise, the process returns to step S302.

[Step S306]
An entry [g] whose entry number is equal to the logical link identification number g indicated by the grant signal SG input in step S305 is read out from the optical transceiver selection table TBB managed by the upstream signal selection control unit 13-3B. Next, the process advances to step S307.

[Step S307]
Based on the value of the enable timer of the entry [g] read out from the optical transceiver selection table TBB in step S306, it is determined whether the logical link identification number g has already been registered in the optical transceiver selection table TBB. If the enable timer value of the entry [g] is larger than 0 (YES), it is determined that the logical link identification number g has already been registered, and the process advances to step S309. If the enable timer value of the entry [g] is 0 (NO), it is determined that the logical link identification number g has not been registered, and the process advances to step S308.

[Step S308]
The discovery target optical transceiver identification number d is set in the optical transceiver identification number of the entry [g] read out from the optical transceiver selection table TBB in step S306. This registers, as an optical transceiver identification number corresponding to the logical link identification number g which has been determined in step S307 to be unregistered, a value indicating an optical transceiver selected during the immediately preceding discovery window. Next, the process advances to step S309.

[Step S309]
An enable timer initial value T is set in the enable timer of the entry [g] read out from the optical transceiver selection table TBB in step S306. This enable timer value is counted down with time but is returned to the enable timer initial value T by a procedure of step S309 when the PON control circuit 12 outputs the grant signal SG indicating the logical link identification number g. Therefore, only if the grant signal SG indicates no logical link identification number g within a time defined by the enable timer initial value T, the enable timer value is set to 0 and the logical link identification number g is set in an unregistered state. This corresponds to disconnection of the logical link indicated by the logical link identification number g. Next, the process advances to step S310.

[Step S310]

The value of the optical transceiver selection signal s to be output to the upstream signal selection unit 13-2 is changed to an optical transceiver identification number e of the entry [g]. In this example, assume that s=e. After that, the process returns to step S302 through step S311. If it is confirmed in step S311 that the operation has been stopped, the processing of this procedure ends.

In the above procedure, the value of the discovery target optical transceiver identification number d is incremented and updated. If, however, for each optical transceiver, the presence/absence of an unregistered ONU connected to the optical transceiver is known in advance, a procedure of updating the discovery target optical transceiver identification number d to exclude, from selection targets, the optical transfer to which no unregistered ONU is connected is also possible. This procedure can shorten the average time until unregistered ONUs are registered.

Figure 12:
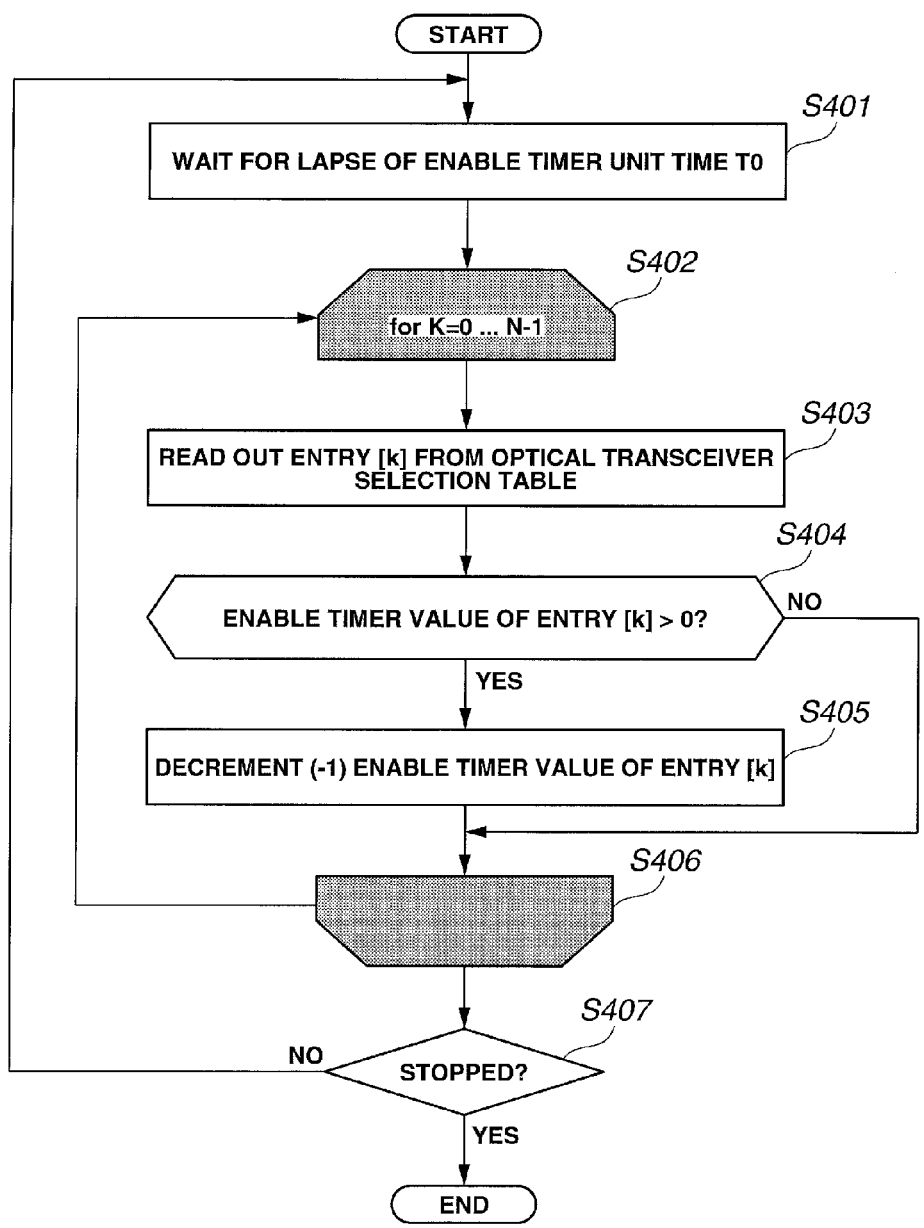
FIG. 12 is a flowchart illustrating a procedure in which the upstream signal selection control unit in the OLT updates the enable timer value of each entry in the optical transceiver selection table according to the second embodiment.
Figure 13:
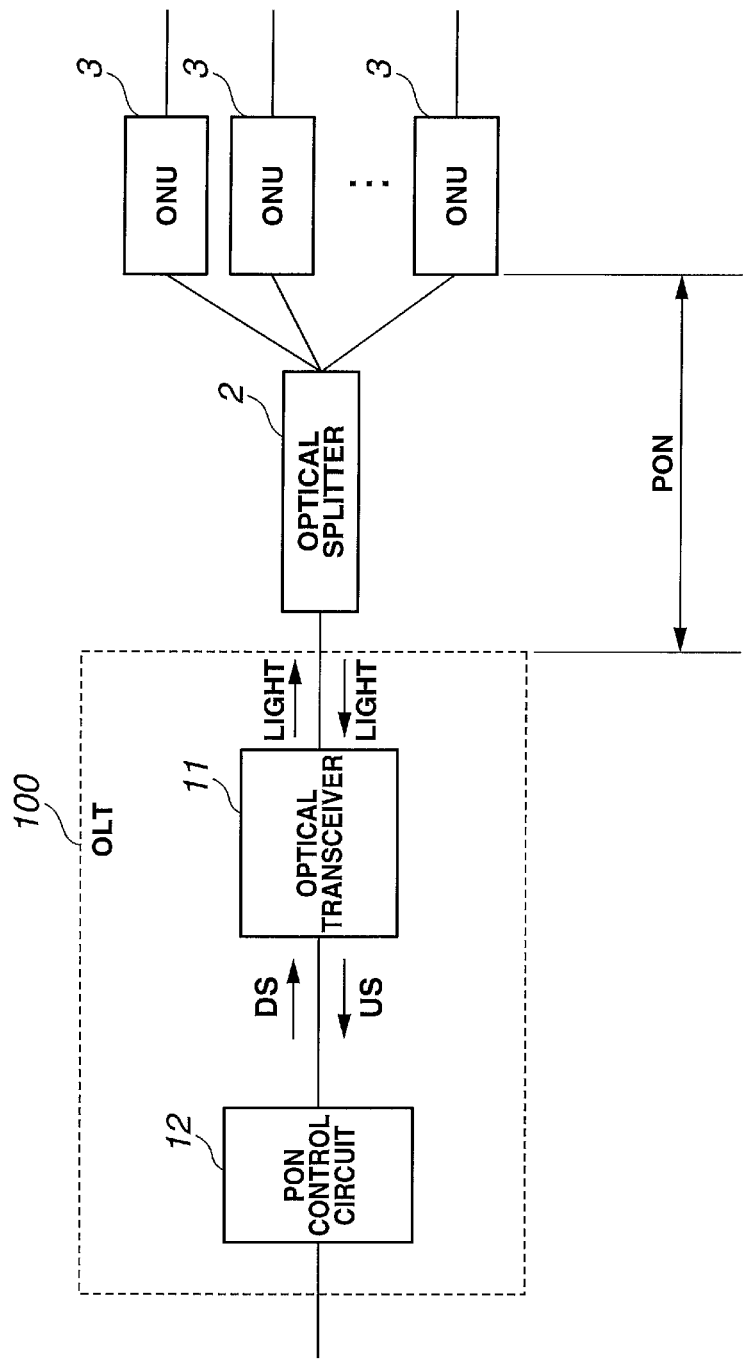
FIG. 13 is a block diagram showing an example of the arrangement of a conventional GE-PON system.

A procedure of updating the enable timer value of each entry in the optical transceiver selection table TBB will be described with reference to FIG. 12. As described with reference to FIG. 11, the enable timer value of each entry in the optical transceiver selection table TBB is counted down with time. FIG. 12 shows a procedure of counting down the enable timer value.

The upstream signal selection control unit 13-3B starts the processing shown in the flowchart of FIG. 12 when the operation of the upstream signal selection control unit 13-3B becomes possible, for example, immediately after power supply to the OLT 1B or initialization of the OLT 1B thereafter, and repeats the processing until the operation of the upstream signal selection control unit 13-3B is stopped, for example, until reinitialization of the selection and distribution circuit 13B including the upstream signal selection control unit 13-3B is instructed or power supply to the OLT 1B is stopped. The upstream signal selection control unit 13-3B repeats the processing shown in FIG. 12 as an interrupt operation during execution of the processing shown in FIG. 11 every time en enable timer unit time T0 elapses.

[Step S401]

The process waits for the lapse of the enable timer unit time T0. In this procedure, every time the enable timer unit time T0 elapses, the enable timer value of each entry in the optical transceiver selection table TBB is decremented by one. When the enable timer value of each entry is decremented by one from the enable timer initial value T every time the enable timer unit time T0 elapses, and then becomes 0, it is determined that a logical link indicated by the logical link identification number of the entry is disconnected, and the grant of the logical link under linkup needs to appear in an upstream signal within a time given by T (enable timer initial value)×T0 (enable timer unit time). Next, the process advances to step S402.

[Step S402]

A procedure of steps S403 to S405 to be described below is performed for each entry (entry number k) in the optical transceiver selection table TBB. This procedure of steps S403 to S405 decrements, by one, the enable timer value of each entry in the optical transceiver selection table TBB (the enable timer value of an entry, which is 0, is not decremented).

[Step S403]

An entry [k] of the entry number k is read out from the optical transceiver selection table TBB, and the process advances to step S404.

[Step S404]

If the enable timer value of the entry [k] read out in step S403 is larger than 0, the process advances to step S405. Alternatively, if the enable timer value is 0, the process advances to step S406.

[Step S405]

The enable timer value of the entry [k] is decremented (−1). After that, the process advances to step S406.

[Step S406]

If the procedure of steps S403 to S405 is performed for all the entries in the optical transceiver selection table TBB, the process returns to step S401; otherwise, the process returns to step S402 to perform the procedure of steps S403 to S405 for the remaining entries. If it is confirmed in step S407 that the operation has been stopped, the processing of this procedure ends.

Note that if the PON control circuit 12 reuses the logical link identification number g for a logical link with the newly registered ONU 3 after the logical link of the logical link identification number g in a linkup state is disconnected, the time after the disconnection is measured, and the PON control circuit 12 should suspend reuse until the elapsed time after the disconnection becomes equal to or longer than T (enable timer initial value)×T0 (enable timer unit time). That is, the logical link with the ONU 3 newly registered during the suspend time of reuse should be assigned with an unused logical link identification number or a logical link identification number for which the suspend time of reuse has elapsed, instead of the logical link identification number g in a reuse suspend state.

As described above, unlike the first embodiment, in the second embodiment, even if the new registration logical link identification number k is not transferred from the PON control circuit 12 to the upstream signal selection control unit 13-3B, the upstream signal selection control unit 13-3B can determine whether the logical link identification number g of the grant signal SG is a new registration logical link identification number, thereby reducing the processing in the PON control circuit 12.

In the first embodiment, it is necessary to transfer the new registration logical link identification number k from the PON control circuit 12 to the upstream signal selection control unit 13-3A during a period from when the logical link between the unregistered ONU 3 and the OLT 1A is established until the OLT 1A gives a grant for the logical link, and store the optical transceiver identification number d in the optical transceiver selection table TBA in association with the logical link identification number k.

That is, in the first embodiment, it is necessary to complete, within a short time, the processing of transferring the logical link identification number k of the logical link to the upstream signal selection control unit 13-3A after the PON control circuit 12 establishes the logical link between the unregistered ONU 3 and the OLT 1A. In the second embodiment, however, such processing in the PON control circuit 12 is unnecessary, and it is thus possible to obtain the effect capable of readily implementing the PON control circuit 12.

Extension of Embodiments

The present invention has been described above with reference to the embodiments, but is not limited to these embodiments. Various changes understandable by those skilled in the art can be made for the arrangements and details of the present invention without departing from the scope of the invention. In addition, the embodiments can be arbitrarily combined and implemented within a consistent range.

INDUSTRIAL APPLICABILITY

The present invention can be used for a station-side apparatus in an optical transmission system such as 10G-EPON, the optical transmission system, and an optical transmission method.

EXPLANATION OF THE REFERENCE NUMERALS AND SIGNS 1 (1A, 1B) . . . OLT (station-side apparatus), 2 (2-0 to 2-$N_{-1}$) . . . optical splitter, 3 . . . ONU (subscriber-side apparatus), 4 . . . host apparatus, 11 (11-0 to 11-$N_{-1}$) . . . optical transceiver, 12 . . . PON control circuit, 12-1 . . . control signal output unit, 13 (13A, 13B) . . . selection and distribution circuit, 13-1 . . . downstream signal distribution unit, 13-2 . . . upstream signal selection unit, 13-3 (13-3A, 13-3B) . . . upstream signal selection control unit, 13-31 . . . memory, 13-32 . . . selection unit, 13-33 . . . registration unit, TB (TBA, TBB) . . . optical transceiver selection table

The invention claimed is:

1. A station-side apparatus in an optical transmission system, for transferring frames between a host apparatus and a plurality of subscriber-side apparatuses connected via first to Nth (N≥2) optical splitters, comprising:
first to Nth optical transceivers that are connected to the first to Nth optical splitters in one-to-one correspondence, and each perform electro-optical conversion of a downstream electrical signal into an optical signal to be output to the subscriber-side apparatuses and photoelectric conversion of an optical signal from one of the subscriber-side apparatuses into an upstream electrical signal;
a selection and distribution circuit that selects one of the first to Nth optical transceivers and outputs an upstream electrical signal input from the selected one of the optical transceivers while distributing and outputting the downstream electrical signal to the first to Nth optical transceivers; and
a control circuit that controls the plurality of subscriber-side apparatuses not to transmit upstream frames at the same time while controlling the selection and distribution circuit,
the selection and distribution circuit including
a selection control unit that selects one of the first to Nth optical transceivers based on a timing of a discovery window for waiting for reception of a registration request frame from an unregistered subscriber-side apparatus, a timing of a grant as a reception period of an upstream frame from a registered subscriber-side apparatus, and a logical link identification number for a logical link with the registered subscriber-side apparatus assigned to the grant, all of which are transmitted from the control circuit.

2. A station-side apparatus in an optical transmission system according to claim 1, wherein
the selection control unit includes
an optical transceiver selection table that represents a correspondence between an optical transceiver identification number and a logical link identification number for a logical link with a registered subscriber-side apparatus, and
a selection unit that acquires, from the optical transceiver selection table, an optical transceiver identification number corresponding to the logical link identification number for the logical link with the registered subscriber-side apparatus assigned to the grant during a period of the grant, and selects one of the first to Nth optical transceivers based on the acquired optical transceiver identification number.

3. A station-side apparatus in an optical transmission system according to claim 2, wherein
the selection control unit further includes
a registration unit that acquires a logical link identification number for a logical link with a subscriber-side apparatus newly registered during a period of the discovery window, and registers, in the optical transceiver selection table, a correspondence between the acquired logical link identification number and an optical transceiver identification number selected during the period of the discovery window.

4. A station-side apparatus in an optical transmission system according to claim 2, wherein
the selection control unit further includes
a registration unit that acquires the logical link identification number for the logical link with the registered subscriber-side apparatus assigned to the grant during the period of the grant, determines whether the logical link identification number has already been registered in the optical transceiver selection table, and registers, if it is determined that the logical link identification number has not been registered, the logical link identification number for the logical link with the registered subscriber-side apparatus assigned to the grant and an optical transceiver identification number selected during a period of an immediately preceding discovery window in association with each other in the optical transceiver selection table.

5. A station-side apparatus in an optical transmission system according to claim 1, wherein
the control circuit includes
a control signal output unit that outputs, to the selection and distribution circuit, an optical transceiver selection control signal indicating the timing of the discovery window for waiting for reception of the registration request frame from the unregistered subscriber-side apparatus, the timing of the grant as the reception period of the upstream frame from the registered subscriber-side apparatus, and the logical link identification number for the logical link with the registered subscriber-side apparatus assigned to the grant, and
the selection control unit includes
an optical transceiver selection table that stores, in association with the logical link identification number for the logical link with the subscriber-side apparatus, an optical transceiver identification number selected during a period of the discovery window when the registration request frame used as a trigger to establish the logical link with the subscriber-side apparatus is received, and
a selection unit that selects one of the first to Nth optical transceivers during the period of the discovery window indicated by the optical transceiver selection control signal, acquires, during a period of the grant indicated by the optical transceiver selection control signal, the optical transceiver identification number stored in the optical transceiver selection table in association with the logical link identification number indicated by the optical transceiver selection control signal, and selects one of the first to Nth optical transceivers based on the acquired optical transceiver identification number.

6. An optical transmission system comprising first to Nth (N≥2) optical splitters, a plurality of subscriber-side apparatuses connected to the first to Nth optical splitters, and a station-side apparatus that transfers frames between a host apparatus and the plurality of subscriber-side apparatuses connected to the first to Nth optical splitters, the station-side apparatus comprising first to Nth optical transceivers that are connected to the first to Nth optical splitters in one-to-one correspondence, and each perform electro-optical conversion of a downstream electrical signal into an optical signal to be output to the subscriber-side apparatuses and photoelectric conversion of an optical signal from one of the subscriber-side apparatuses into an upstream electrical signal, a selection and distribution circuit that selects one of the first to Nth optical transceivers and outputs an upstream electrical signal input from the selected one of the optical transceivers while distributing and outputting a downstream electrical signal to the first to Nth optical transceivers, and a control circuit that controls the plurality of subscriber-side apparatuses not to transmit upstream frames at the same time while controlling the selection and distribution circuit, and the selection and distribution circuit including a selection control unit that selects one of the first to Nth optical transceivers based on a timing of a discovery window for waiting for reception of a registration request frame from an unregistered subscriber-side apparatus, a timing of a grant as a reception period of an upstream frame from a registered subscriber-side apparatus, and a logical link identification number for a logical link with the registered subscriber-side apparatus assigned to the grant, all of which are transmitted from the control circuit.

7. An optical transmission method of transferring frames between a host apparatus and a plurality of subscriber-side apparatuses connected to first to Nth (N≥2) optical splitters in a station-side apparatus by providing the first to Nth optical splitters, the plurality of subscriber-side apparatuses connected to the first to Nth optical splitters, and the station-side apparatus provided between the host apparatus and the first to Nth optical splitters, the method comprising:

providing, to the station-side apparatus, first to Nth optical transceivers that are connected to the first to Nth optical splitters in one-to-one correspondence, and each perform electro-optical conversion of a downstream electrical signal into an optical signal to be output to the subscriber-side apparatuses and photoelectric conversion of an optical signal from one of the subscriber-side apparatuses into an upstream electrical signal, a selection and distribution circuit that selects one of the first to Nth optical transceivers and outputs an upstream electrical signal input from the selected one of the optical transceivers while distributing and outputting a downstream electrical signal to the first to Nth optical transceivers, and a control circuit that controls the plurality of subscriber-side apparatuses not to transmit upstream frames at the same time while controlling the selection and distribution circuit; and selecting, by the selection and distribution circuit, one of the first to Nth optical transceivers based on a timing of a discovery window for waiting for reception of a registration request frame from an unregistered subscriber-side apparatus, a timing of a grant as a reception period of an upstream frame from a registered subscriber-side apparatus, and a logical link identification number for a logical link with the registered subscriber-side apparatus assigned to the grant, all of which are transmitted from the control circuit.

* * * * *